No. 827,232. PATENTED JULY 31, 1906.
T. D. GORDON.
HARNESS BREAST COLLAR.
APPLICATION FILED JULY 7, 1905.
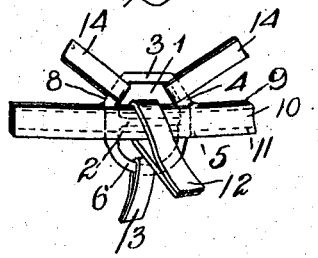
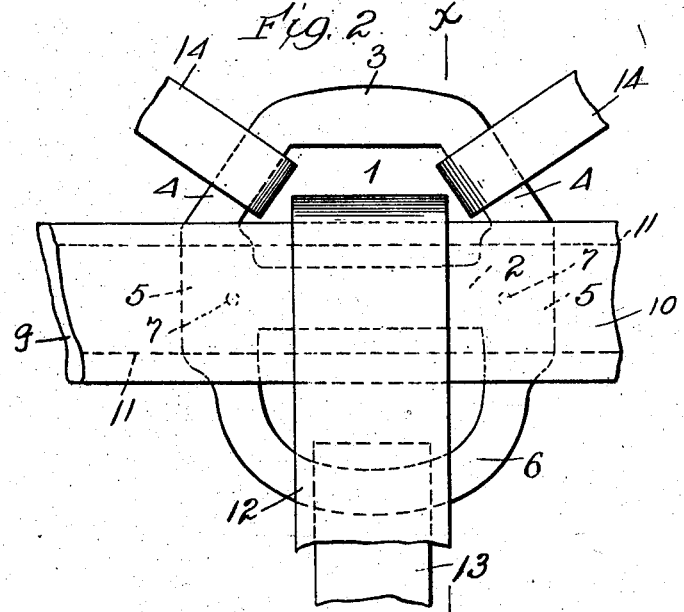
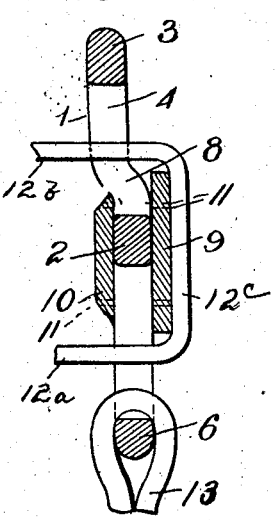
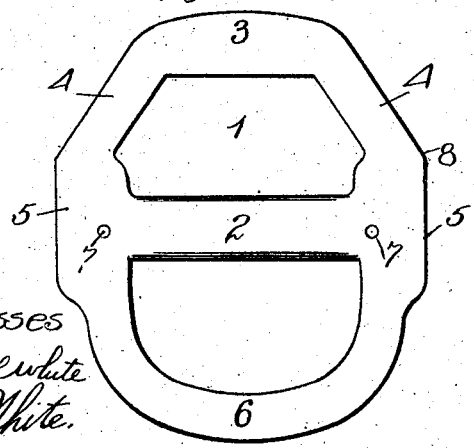
Witnesses
Harry R. White
Ray White
Inventor:
T. D. Gordon,
By A. M. Richards,
Atty.
THE NORRIS PETERS CO., WASHINGTON, D. C.

UNITED STATES PATENT OFFICE.

THOMAS D. GORDON, OF MONMOUTH, ILLINOIS.

HARNESS BREAST-COLLAR.

No. 827,232.

Specification of Letters Patent.

Patented July 31, 1906.

Application filed July 7, 1905. Serial No. 268,635.

*To all whom it may concern:*

Be it known that I, THOMAS D. GORDON, a citizen of the United States, residing at Monmouth, in the county of Warren and State of Illinois, have invented a certain new and useful Harness Breast-Collar, of which the following is a specification.

The subject-matter of this invention is harness breast-collars, and has relation more particularly to improvements in the center D or D-iron thereof.

In the use of the breast-collar team-harness as heretofore constructed certain difficulties and disadvantages have been met with and objections have arisen to their use. This type or character of harness being employed on light or, as it is known in the trade, "road-work," an essential is that all of the parts be of a neat, attractive, and compact order and assemblage and that they be so constructed and arranged that there are no buckles, tongues, or other projecting parts to cause injury or worry to the animal or to detract from the appearance of the harness. Another essential is that the several parts of the breast-collar and attached members be so constructed that no irregular or uneven movements of any part thereof due to the motion of the animal will cause the D or any of the parts connected thereto or therewith to chafe, irritate, or injure its delicate skin and coat and to provide a D or D-iron of such construction that while strong, safe, and durable all the necessary component parts of the harness may be attached thereto in a simple and ready manner without buckles or tongues and be so disposed and arranged that they will not interfere with the movements of the animal, will not injure his skin or coat nor cause him pain or uneasiness and such that the full and free breathing of the animal when at speed will not be impeded constitutes the main object of my invention.

In the accompanying drawings, which illustrate my invention, and in which the same reference-numeral designates the same part in the several figures thereof, Figure 1 is a perspective, partly broken away; Fig. 2, a front elevation; Fig. 3, a sectional view taken in the line *x x* in Fig. 2, the pole and martingale straps shown in elevation; Fig. 4, a front elevation of the D, and Fig. 5 a side elevation of the same.

The D is indicated by the numeral 1 and comprises parallel lateral projections 5, having orifices 7, a lower martingale-loop 6, an attaching and securing bar 2, connecting the projections 5, and an upper offset loop 8, consisting of arms 4, converging toward their upper ends, which latter are united by an arm 3. All edges of the D are rounded, and it is constructed without sharp angles which would cause injury or pain to the horse when in motion.

9 is a breast-strap, to the ends of which the traces (not shown) are fixed, and 10 is an ordinary "fold" or strap used in layered or "folded" work.

The D is placed on the breast-strap with the bar 2 longitudinally thereof, and, as shown, stitches 11 are taken through the breast and fold straps throughout the length and on both of its sides to hold it firmly in place. If greater security is desired, the D may be riveted through the orifices 7 to the breast-strap, in which event the outer end of the rivet will be hidden from view by the fold 10, and the inner end will be kept from contact with the animal by the interposed pole-strap 12, hereinafter described. The lower martingale 13 is passed around the loop 6 and is secured in the ordinary manner to the girth. (Not shown.) When it is desired to use an upper or head martingale, (not shown,) the lower end thereof is secured to the arm 3 of the D and the split upper ends to the bit-rings. To each converging arm 4 is secured a connecting-strap 14, which straps engage at their distal ends with the usual neck-strap. (Not shown.) These straps by reason of the oblique arrangement of said arms will not be drawn in a jerky twisting manner to violently wrench first upon one and then the other side of the breast-strap and in directions contrary to that desired, the effect of which will be to chafe or irritate the skin, but in a smooth and even passage, and by reason of the offset 8 will be clear and free from contact with the throat of the animal. One end 12$^a$ of the pole or tongue strap 12 is passed through the upper loop of the D, thence downwardly inside the breast-strap and outwardly through the loop 6, where it meets and is buckled to the other end 12$^b$ of said strap, which has previously been passed through and secured to the staple of the neck-yoke. The portion 12$^c$ of the pole-strap will lie in the cavity formed by the shoulder-bones of the animal, and the offset 8 will stand outwardly free from contact with and at such distance from the trachea that it will cause no interference with nor impediment to the full and free breathing of the animal when at speed.

Having thus described my invention and the benefits accruing from its use, I claim as new—

1. A D for breast-collar harness comprising substantially parallel lateral projections, a transversely-arranged bar connecting them, a lower martingale-loop, and offset converging upper arms united by a substantially horizontal upper bar.

2. A D for breast-collar harness comprising substantially parallel lateral projections provided with rivet-holes, a transversely-arranged bar connecting said projections, a lower martingale-loop, and offset converging bars united by a substantially horizontal upper bar.

3. A D for breast-collar harness comprising a transversely-arranged bar adapted to lie between the breast-strap and fold of the breast-collar and to be secured to said straps longitudinally thereof by stitches, a lower loop adapted for engagement therewith of a lower martingale, diagonally-arranged converging arms adapted for engagement therewith of obliquely-disposed connecting-straps, and an upper frame-bar connecting the converging arms at their points of approach.

4. A D for breast-collar harness comprising lateral, substantially parallel projections having each an orifice, a curved, lower martingale-loop, a transversely and centrally arranged securing-bar connecting said projections, and an upper offset loop comprising converging arms united by a substantially horizontal arm.

5. In a harness, a breast-collar, a D fixed thereto, said D comprising substantially parallel lateral projections having each an orifice or rivet-hole therethrough, a transversely and centrally arranged securing-bar to which said collar is fixed connecting said projections, offset converging upper arms, connecting-straps secured thereto, an upper arm connecting said converging arms, and a pole-strap fixed thereto.

6. In a harness, a D comprising a transversely-arranged bar, parallel lateral projections united thereby, a lower, loop, an upper offset loop having converging arms and a connecting-bar, a breast-collar fixed to the transverse bar, a martingale secured to the lower loop, connecting-straps secured to the converging arms of the offset loop, and a pole-strap secured to the connecting-bar.

THOMAS D. GORDON.

Witnesses:
L. M. RICHARDS,
CHAS. W. FOX.